UNITED STATES PATENT OFFICE.

FREDERICK J. MAYWALD, OF NEW YORK, N. Y.

FRIABLE VEGETABLE DYE AND PROCESS OF MAKING SAME.

No. 894,965.      Specification of Letters Patent.      Patented Aug. 4, 1908.

Application filed June 14, 1904. Serial No. 212,499.

*To all whom it may concern:*

Be it known that I, FREDERICK J. MAYWALD, a citizen of the United States, residing in the borough of Brooklyn, city of New York, county of Kings, and State of New York, have invented certain new and useful Improvements in Coloring Materials and Methods of Preparing the Same; and I do hereby declare the following to be a full, clear, and exact description of the same, such as will enable others skilled in the art to which it appertains to make and use the same.

My invention relates generally to dyestuffs and to methods of preparing the same; and my invention consists in a method of producing, from vegetable coloring extracts, such as logwood, fustic, Brazil wood, Persian berry, and archil, which are viscous in their nature, a dry, friable and substantially non-hygroscopic but water-soluble dyestuff the extractive matter within which is chemically unchanged, being the same as when the dyestuff was in a fluid condition, and which will not run together with exposure to heat; and my invention consists further in the coloring material so produced.

Many of the vegetable coloring extracts, as for example, logwood and fustic, are viscous in their nature, are extremely difficult if not impossible to dry without chemical alteration and without material impairment of their properties, and hence as commonly made and used in the arts, are in the form either of a liquid, a paste, or a mass having the consistency of thick pitch. There are several objections to the extracts in these forms, as is well known to those skilled in the art; such as, for example, liability to injury through freezing, liability to leakage, trouble and waste in handling, liability to variation in tinctorial power due to evaporation or other cause, and difficulty of dissolving in cold water. If such extracts be evaporated to dryness, in many cases the material is so altered chemically as to be valueless or nearly so as a dyestuff, and in other cases the material is extremely hygroscopic, tending to absorb moisture and to melt and run together.

One object of my invention is to produce from dyestuffs, and particularly from logwood extract, a dry material, which, while chemically unaltered, and while having high tinctorial power, is non-hygroscopic, is not affected injuriously by moisture of the air, nor by heat, is friable, permanent, and is readily and completely soluble in water.

Another object is to render the process of preparing the coloring material simple, easy to carry out, and relatively inexpensive.

A further object is to avoid the production of corrosive gases, or noxious or dangerous fumes or odors, such as are given off during the manufacture of logwood powders by certain chemical methods.

In carrying out my process, I add to the dyestuff to be solidified a soluble colloidal carbohydrate body hereafter mentioned, and then evaporate the mixture to dryness. The substance which I prefer to use is dextrin, and it is preferably used in solution, as by so doing more uniform results may be obtained. But instead of using dextrin, I may use other similar bodies; as, for example, gum arabic, tragacanth or other gums of similar type. The compounds resulting from the mixture of the substances named with vegetable coloring extracts, such as mentioned, and from the evaporation of the mixtures, dry rapidly and easily to a powder which is permanent, dry, substantially non-hygroscopic, and will not run together when exposed to heat or when exposed for a considerable time to moist air such as may exist within a bell jar when there is a dish of water therein. If, after long-continued exposure to wet air, the powder has slightly agglutinated, it will readily fall to a powder again, or can be broken up easily after a short exposure to dry air. This powder is readily and completely soluble in cold water and easily and rapidly soluble in hot water. During its preparation and manufacture no noxious or dangerous fumes or odors, or corrosive gases, are given off; no complicated apparatus is required, and the temperature to which the material is exposed during drying need not be watched closely. Any temperature may be used, so long as it is below the temperature of destruction of the organic matter. Drying may take place with equal facility in open pans or in a vacuum chamber. The resulting compounds, when in solution, dye wool which has been mordanted in the usual way with bichromate and tartaric acid, readily and easily, and with full shade, the same as if ordinary logwood extract had been used, but with purer tone and with more uniform results. By this process, the extractive material is not changed chemically, but remains the same as when in the fluid condition.

The following will serve as an example of a method of producing, according to my process, a dry compound from logwood extract by the use of dextrin: To 100 lbs. of logwood extract of 51 degrees Twaddell is added 10 lbs. of dextrin which has been dissolved in a small quantity of water. The mixture is stirred well, and then evaporated to dryness. The resulting mass falls readily to powder, mere rubbing being sufficient to reduce it to a fine powder.

It will be apparent to those skilled in the art, from the above description, how similar dry compounds may be obtained from other dyewood or vegetable extracts by the use of dextrin, and from logwood or other extracts by the use of any of the substances mentioned above as equivalents of dextrin. Without attempting to mention all of the vegetable coloring materials which, by the process above described, may be reduced to a dry condition, I will mention fustic, Brazil wood, Persian berry, and archil or orchil, as the name is variously spelled.

I do not limit myself to the use of a 51 degree Twaddell solution, but may use solutions of different strength. The particular solution mentioned, however, is the one most used commercially.

I do not limit myself to the use of any particular proportion of the dextrin or other solidifying agent, as the proportion of such material used may vary somewhat according to the result desired to be obtained.

A sample of logwood powder made by the use of dextrin according to the process above described has been exposed by me under a bell jar containing a dish of water, for more than two months, without its showing the slightest sign of absorbing moisture or getting wet. Yet it was easily soluble to a clear solution in water.

The coloring matters contained in the extracts of logwood, Brazil wood, archil or orchil, and certain other substances, are oxidized coloring matters. The coloring matters contained in the extracts of fustic, Persian berry, and certain other substances, are not oxidized coloring matters. In this present case I claim specifically my process as applied to logwood and other oxidized chemical compounds, and in another application for Letters Patent, filed June 14, 1904, Sr. No. 212,500, I claim my said invention as applied to fustic and other non-oxidized coloring matters.

I do not limit myself to the use of any particular mordant in connection with the coloring or dyeing material produced by my process. The same mordants may be used which are used in connection with ordinary extracts of similar nature.

It will be understood that the process above described is only one way of carrying out my invention, and that the process may be varied greatly without departing from my invention.

If desired, the dextrin or other solidifying agent may be added to the extract during the operation of extracting the coloring material from its vegetable source, my process being combined with that of producing the extract. And if desired, instead of adding the solidifying material to a liquid solution, it may be added to the pasty, pitch-like, or even to the solid forms of the extract, and I do not intend by the term "extract" as herein used, to denote only a liquid substance, but intend also to include the pasty, pitch-like, or even dry form of the dyestuff.

Dyewood and other vegetable coloring extracts, and particularly logwood extracts, of 51 degrees Twaddell strength, usually contain from 60 to 70 percent. of dyewood extractive matter; from which it follows that in the dry compound formed from such an extract to which 10 per cent. of dextrin has been added, there will be from 12 to 14 per cent. of dextrin, approximately.

What I claim is:—

1. The process of preparing a dry friable dyestuff from viscous extracts of vegetable dye materials which consists in adding a soluble colloidal carbohydrate body to such a viscous extract and evaporating the mixture to a dry friable condition.

2. The process of preparing a dry friable dyestuff from viscous logwood extracts which consists in adding a soluble colloidal carbohydrate body to such a viscous logwood extract and evaporating the mixture to a dry friable condition.

3. The process of preparing a dry friable dyestuff from viscous logwood extracts which consists in adding dextrin to such extracts and evaporating the mixture to a dry friable condition.

4. As a new article of manufacture, a dry friable mixture of an extract of a vegetable dye material yielding viscous extracts, and a soluble colloidal carbohydrate body.

5. As a new article of manufacture, a dry friable mixture of an extract of vegetable dye material and dextrin.

6. As a new article of manufacture, a dry friable mixture of logwood extract and dextrin.

In testimony whereof I affix my signature, in the presence of two witnesses.

FREDERICK J. MAYWALD.

Witnesses:
H. M. MARBLE,
D. HOWARD HAYWOOD.